United States Patent
Weinberger

(10) Patent No.: US 11,691,851 B2
(45) Date of Patent: Jul. 4, 2023

(54) LINEAR DRIVE SYSTEM FOR AN ELEVATOR INSTALLATION

(71) Applicant: Inventio AG, Hergiswil (CH)

(72) Inventor: Karl Weinberger, Immensee (CH)

(73) Assignee: INVENTIO AG, Hergiswil NW (CH)

(*) Notice: Subject to any disclaimer, the term of this patent is extended or adjusted under 35 U.S.C. 154(b) by 979 days.

(21) Appl. No.: 16/338,513

(22) PCT Filed: Oct. 12, 2017

(86) PCT No.: PCT/EP2017/076086
§ 371 (c)(1),
(2) Date: Apr. 1, 2019

(87) PCT Pub. No.: WO2018/069455
PCT Pub. Date: Apr. 19, 2018

(65) Prior Publication Data
US 2020/0039793 A1    Feb. 6, 2020

(30) Foreign Application Priority Data
Oct. 14, 2016  (EP) ..................... 16193960

(51) Int. Cl.
B66B 11/04 (2006.01)
H02K 1/06 (2006.01)
H02K 7/08 (2006.01)
H02K 41/03 (2006.01)

(52) U.S. Cl.
CPC ............ B66B 11/0407 (2013.01); H02K 1/06 (2013.01); H02K 7/08 (2013.01); H02K 41/031 (2013.01)

(58) Field of Classification Search
CPC .......................... B66B 11/0407; H02K 41/031
See application file for complete search history.

(56) References Cited

U.S. PATENT DOCUMENTS

| | | | |
|---|---|---|---|
| 3,771,462 A | 11/1973 | Barthalon et al. | |
| 5,440,183 A * | 8/1995 | Denne | H02K 7/00 310/12.26 |
| 5,751,076 A * | 5/1998 | Zhou | B66B 11/0407 187/250 |
| 2003/0106746 A1* | 6/2003 | Grundmann | H02K 15/03 187/289 |

(Continued)

FOREIGN PATENT DOCUMENTS

| | | | |
|---|---|---|---|
| CN | 101016135 A | | 8/2007 |
| CN | 101159389 A | * | 4/2008 |

(Continued)

OTHER PUBLICATIONS

Machine Translation of DE-202013000279-U1 (Year: 2013).*
Machine Translation of WO 2016113434 A2 (Year: 2016).*

*Primary Examiner* — Naishadh N Desai
(74) *Attorney, Agent, or Firm* — William J. Clemens; Shumaker, Loop & Kendrick, LLP

(57) ABSTRACT

A linear drive system for an elevator installation having an elevator car includes a stationary part for alignment with a hoistway wall of the elevator installation and a movable part that moves along the stationary part. The movable part is connected to the elevator car or to a counterweight, wherein the stationary part is shaped so as to substantially envelope the movable part.

17 Claims, 3 Drawing Sheets

(56) References Cited

U.S. PATENT DOCUMENTS

| | | | |
|---|---|---|---|
| 2004/0016360 A1* | 1/2004 | Tent | H02K 41/031 104/290 |
| 2005/0077113 A1* | 4/2005 | Deplazes | B66B 11/0407 187/289 |
| 2009/0058234 A1* | 3/2009 | Chen | H02K 21/24 310/68 R |
| 2012/0061189 A1* | 3/2012 | Imfeld | B66B 5/044 187/350 |
| 2015/0307325 A1* | 10/2015 | Fargo | B66B 11/0438 187/250 |
| 2017/0355567 A1* | 12/2017 | Schmidt | H02K 41/031 |

FOREIGN PATENT DOCUMENTS

| | | | | |
|---|---|---|---|---|
| DE | 202013000279 U1 * | 4/2013 | | B66B 11/0407 |
| DE | 202013000279 U1 | 4/2013 | | |
| EP | 0785162 A1 | 7/1997 | | |
| EP | 1818305 A1 | 8/2007 | | |
| GB | 2281664 A * | 3/1995 | | B66B 11/0407 |
| GB | 2281664 A | 8/1995 | | |
| JP | H02233488 A * | 9/1990 | | |
| JP | H02233488 A | 9/1990 | | |
| JP | HO2233488 A * | 9/1990 | | |
| JP | H0775324 A | 3/1995 | | |
| JP | 3181656 B2 | 7/2001 | | |
| WO | 0202451 A1 | 1/2002 | | |
| WO | WO-2016113434 A2 * | 7/2016 | | B66B 11/0407 |

\* cited by examiner

LINEAR DRIVE SYSTEM FOR AN ELEVATOR INSTALLATION

FIELD

The subject of the invention relates to a linear drive system for an elevator installation having an elevator car.

BACKGROUND

Different elevator configurations with linear motor drive systems are known. For example, EP0785162A1 describes a linear motor for a center-guided elevator system, whereby the elevator car is guided along the hoistway by conventional, opposing guide rails. In this configuration the elevator car is moved by means of a permanent magnet linear drive system along the hoistway in the vertical direction. Such a permanent magnet linear drive system typically comprises a flat, stationary part with permanent magnets, which is fastened to a hoistway wall, and a movable part, which is fastened to the elevator car.

A further development is described in WO0202451A1 wherein a linear drive is provided to propel an elevator car interconnected to a counterweight. As before, the car is guided along the hoistway by conventional guide rails. The linear motor consists of a secondary element and a primary element, said secondary element having one or several magnets and the primary element having both windings and permanent magnets. The secondary element extends over an area covered by the primary element during the journey of the elevator car.

A cantilever-guided or rucksack elevator installation is illustrated in EP1818305A1 having a linear drive system with a stationary part, a longitudinal axis of which is arranged in vertically along a shaft wall of the elevator installation, and with a movable part which moves along the stationary part. The elevator car is arranged in a rucksack configuration and movable by the linear drive system along the stationary part. The stationary part has at least two inclined interaction surfaces having surface normals which are oriented towards the elevator car. The movable part includes at least two units which are so arranged on a rear side of the elevator car so that during the drive mode each of the two units produces a movement along one of said interaction surfaces to thereby move the elevator car. By virtue of the inclined orientation of the interaction surfaces relative to one another results in a spatial, i.e. 3-dimensionally acting, guidance.

A center-guided, ropeless elevator is described and illustrated in JP3181656B2. In that system, U-shaped yokes are laterally spaced from each other and attached to opposing hoistway walls. A blade forming a permanent magnet is mounted on each side of the elevator car to extend laterally into the opening of the associated U-shaped yoke. When energized, coils mounted within the yokes will prevent the permanent magnet and the elevator car from moving horizontally in the transverse direction but cannot prevent horizontal movement in the lateral direction. Similar linear drives are described in DE202013000279U1 and GB2281664A.

The previously known approaches are technically complicated, require much material and space in the elevator hoistway and are thus cost-intensive.

Additionally, the components of the prior linear drives are generally exposed or open to the elevator hoistway. Such arrangements create difficulties in ensuring a sufficiently small air gap between the stationary part and the movable part of the linear drive system is both provided and consistently maintained during travel of the elevator car throughout its path along the hoistway. Any deviation in the air gap will have a dramatic influence on the efficiency of the linear drive (efficiency is inversely proportional to the square of the air gap). Furthermore, as the components of the linear drive in the previous systems are generally exposed to the elevator hoistway, they are susceptible to pollution such as oil, dirt or dust etc., which if present within the air gap will hamper the magnetic flux interaction between the stationary part and to movable part of the drive and thereby significantly reduce drive efficiency. A further disadvantage of the prior art linear drives if that they are ineffective at preventing the magnetic flux generated between the stationary and movable parts from straying into the rest of the elevator hoistway. Stray magnetic flux will again result in diminished drive efficiency.

As outlined in the summary of the prior art above, each of the linear drives is specifically intended for a very particular application depending upon the arrangement of the elevator such as whether the elevator car is center or cantilever guided or whether the installation utilizes a counterweight or not. There is no previous disclosure of a linear drive that can be used globally for all these elevator configurations.

SUMMARY

It is therefore an objective of the present invention to solve at least one of the problems associated with the previous linear drives by providing a linear drive system for an elevator installation having an elevator car. The linear drive system comprises a stationary part for alignment with a hoistway wall of the elevator installation and a movable part which moves along the stationary part. The movable part is connectable to the elevator car or to a counterweight which is thereby movable by the linear drive system along hoistway. The stationary part is shaped so as to substantially envelope the movable part.

It should be noted that the term "substantially envelope" as used herein means that the stationary part encircles or encloses the movable part by at least 280°, and more preferably by the complete 360°.

Since the stationary part is shaped so as to substantially envelope the movable part all components of the linear drive system are enclosed within the stationary part and not exposed to the elevator hoistway. With this arrangement it is much easier to maintain the tolerances between the stationary part and the movable part to a minimum and, more particularly, to ensure that a small air gap between the stationary part and the movable part of the linear drive system is both provided and consistently maintained during travel of the elevator car throughout its path along the hoistway. Thereby, the efficiency of the drive is constant during travel and by providing an air gap of less than 1 mm the drive efficiency can be increased by more than 90% in comparison to the prior art linear drives.

Furthermore, with the stationary part substantially enveloping the movable part, firstly the components of the linear drive are less exposed and susceptible to pollution such as oil, and secondly the arrangement prevents magnetic flux generated between the stationary and movable parts from straying into the rest of the elevator hoistway. Accordingly, the efficiency of the drive can be maintained at a high and consistent level throughout the lifespan of the drive.

In order to provide the necessary magnetic flux interaction to effect movement of the movable part relative to the stationary part the linear drive system preferably includes a plurality of permanent magnets provided on one of the stationary part and the movable part and a plurality of coils provided on the other of the stationary part and the movable part.

In a preferred embodiment of the present invention the magnets are provided on the stationary part while the coils are arranged on the movable part. With this configuration it is not necessary to provide coils and the associated electrical power supply along that entire length of the secondary part which, when installed, extends through the entire height of the elevator hoistway. Instead, the coils and power supply are limited to the small dimension defined by the movable part. Furthermore, by providing the passive magnets on the stationary part and the active coils on the movable part it is possible to use a single stationary part to drive multiple independent movable parts along the elevator hoistway. Accordingly, the arrangement can be used to independently drive multiple elevator cars within the same hoistway.

The permanent magnets can be aligned at a non-zero angle to the horizontal axis and can be for example 45°. This alignment will help to reduce ripple force when the linear drive system is in operation.

In some arrangements requiring the movement of heavy elevator loads, such as in a counterweight-less elevator installation, it may be necessary to provide strong magnets such as neodymium permanent magnets.

Alternatively, for lighter load applications ferrite permanent magnets may suffice.

Preferably, the permanent magnets are arranged sequentially along the vertical axis of the drive between non-magnetic elements. The non-magnetic elements can act as magnetic flux concentrators to further enhance efficiency of the linear drive system.

Advantageously, the depth of the permanent magnets and the non-magnetic elements is identical so as to form a consistently flat surface facing towards the coils.

Preferably, the stationary part comprises an enclosure encircling the movable part and having a longitudinal opening or slot so as to permit connection of the movable component to an elevator car or counterweight. Preferably the enclosure excluding the slot encircles the movable part by at least 280°.

The enclosure can be fabricated from sheet metal such that it can subsequently be formed or folded into the required geometrical shape. The sheet metal can be non-magnetic so that the enclosure may form a magnetic shield to prevent or reduce magnetic flux from straying externally into the elevator hoistway. Retaining the magnetic flux within the stationary part will also enhance the efficiency of the linear drive system.

One or more brushes or resilient elements can be provided to close the opening or slot to prevent pollution from egressing into the stationary part.

Preferably, the stationary part is formed from multiple sections which are identical and chamfered at either end so as to ensure that neighboring sections are easily and accurately aligned during installation in the hoistway.

In order to prevent the movable part from moving in the horizontal plane within the stationary part while ensuring smooth vertical relative movement, guidance means is provided between movable part and the stationary part.

Although many guidance means are available such as bearings, guide shoes, roller guides etc., in a preferred embodiment of the invention, the guidance means is in the form of horizontally aligned needle bearings provided on each wall of the movable part.

The invention also provides an elevator installation comprising an elevator car, a linear drive system as defined above and one or more bridge portions interconnecting the movable part of the linear drive system to either the elevator car or a counterweight.

Preferably, one or more ducts can be provided in the bridge portions so as to provide passage of electrical cables through to the movable part and subsequently onto any coils mounted on the movable part.

DESCRIPTION OF THE DRAWINGS

The above, as well as other, advantages of the present invention will become readily apparent to those skilled in the art from the following detailed description of a preferred embodiment when considered in the light of the accompanying drawings in which.

DETAILED DESCRIPTION

Figure 1:
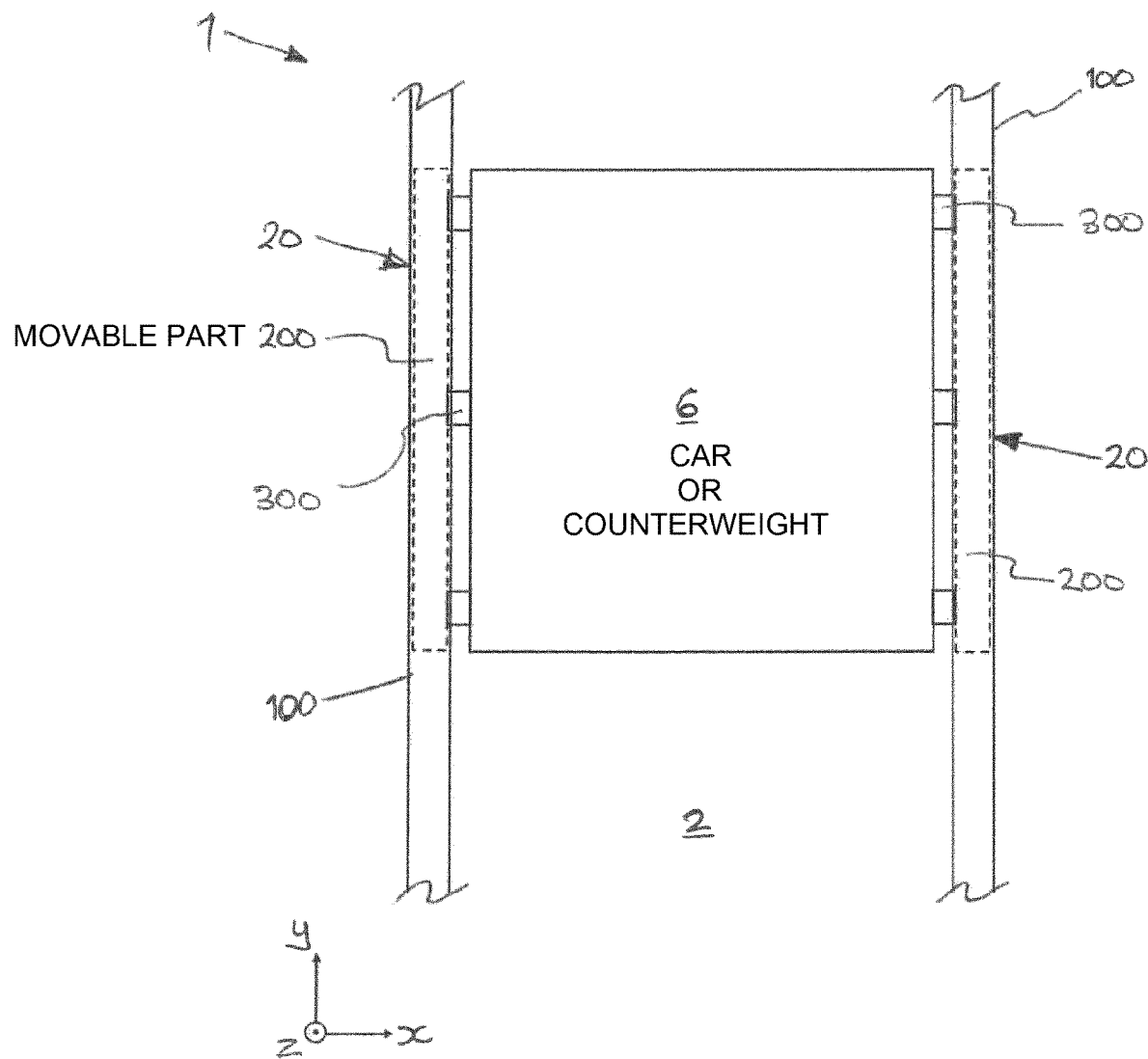
FIG. 1 is a partial, schematic side view of an elevator installation with a linear drive system according to a first embodiment of the present invention.

An elevator installation 1 according to a first embodiment of the present invention is illustrated in FIG. 1. Conventionally, the installation 1 includes a hoistway 2 bound by hoistway walls and an elevator car 6 (or counterweight 6) which is movable vertically within the hoistway 2 to transport passengers and goods to their requested destination floors or landings within a building serviced by the elevator installation 1. In the present example, rather than providing conventional guide rails to guide the elevator car 6 as it moves vertically along the hoistway 2, two linear drive systems 20 are arranged at opposing sides of the car 6 to not only guide the car 6 but also to propel the car 6 in the required direction along the hoistway 2. Redundancy is an advantage that results through the use of two drive systems 20, however it will be easily appreciate that a single drive system could equally be utilized.

Each of the linear drive systems 20 comprises a stationary part 100 (also termed a support column) extending parallel to the y or vertical direction and fastened by means of conventional brackets to a neighboring hoistway wall. Moreover, each drive system includes a movable part 200 (illustrated by dashed lines) retained with stationary part 100. In the present example, the movable part 200 has a length corresponding to the height of the elevator car 6 but it will be easily appreciated by the person skilled in the art that other lengths can be used depending upon the specific application. Within the elevator installation 1, the car 6 is rigidly interconnected to the movable part 200 of each linear drive system 20 by a plurality of bridge portions 300. Controllable electrical power can be supplied synchronously to each of the linear drive systems 20 so as to either maintain the elevator car 6 at a stationary vertical position within the hoistway or to actively drive elevator car 6 upwards or downwards along the hoistway 2.

The linear drive system 20 is further described with reference to the schematic plan view illustrated in FIG. 2. The stationary part 100 generally defines the outermost boundary of the drive system 20 and retains therein the movable part 200. The stationary part 100 comprises a rectangular enclosure 102 having a rear wall 104 facing towards a hoistway wall, two opposing side walls 108 and a front wall 106 facing towards the elevator car 6. A longitudinal opening or slot 112 is formed in the front wall 106 permitting passage of the bridge portions 300. One or more brushes or resilient elements 114 are provided to close the opening or slot 112 after passage of the bridge portions 300. Within the stationary part 100, permanent magnets 116 are attached to the inner surface of the opposing side walls 108.

Preferably, the enclosure 102 can be fabricated from sheet metal which can subsequently be formed or folded into the required geometrical shape. Although the stationary part 100 in the present example is formed in a rectangular shape due to the enclosure 102, it will easily be appreciated it can have any of a wide variety of shapes so long as it substantially envelopes the movable part 200.

Furthermore, the sheet metal can be non-magnetic so that the enclosure 102 may form a magnetic shield to prevent or reduce magnetic flux from straying externally into the elevator hoistway 2. Retaining the magnetic flux within the stationary part 100 will also enhance the efficiency of the linear drive system 20.

The movable part 200 of the linear drive system 20 is accommodated within the stationary part 100 and is retained and prevented from moving in the horizontal x-z plane by the stationary part 100. The movable part 200 has a main body 202 into which a plurality of coils 204 are embedded. The coils 204 are arranged on opposing sides of the main body 202 so as to face the corresponding permanent magnets 116 on stationary part 100 across an air gap g. Controllable electrical power can be supplied to the coils 204 so as to generate electromagnetic flux which in turn interacts with the flux from the permanent magnets 116 to generate thrust enabling vertical movement of the movable part 200, and thereby the elevator car 6, relative to the stationary part 100. In order to enhance efficiency of the linear drive system 20, the air gap g should be as small as possible and preferably less than 1 mm.

Figure 3:
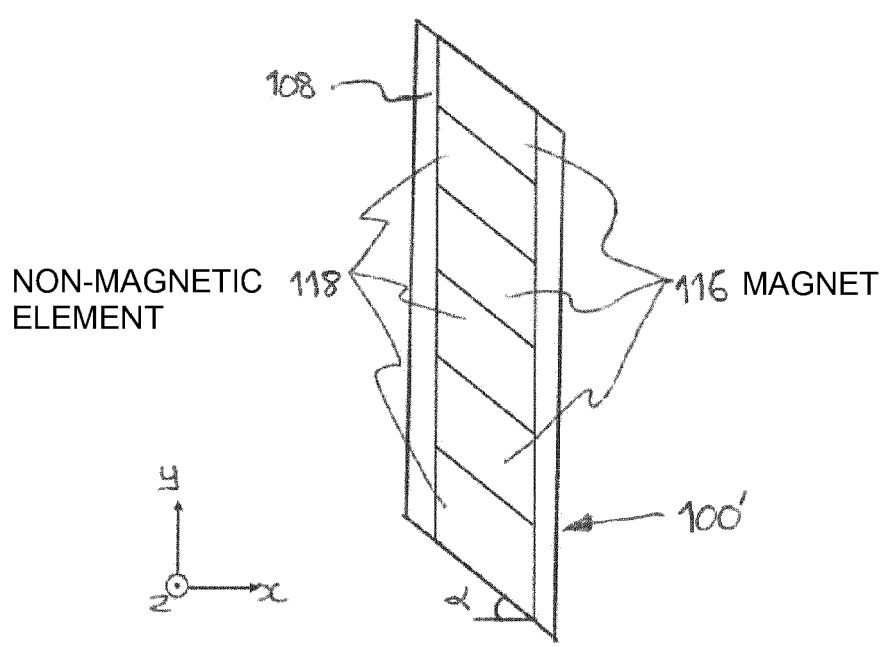
FIG. 3 is a partial, schematic side view illustrating a sequential arrangement of permanent magnets and non-magnetic elements provided on chamfered side walls of a stationary part of the linear drive system of FIGS. 1 and 2.

Preferably, as illustrated in in the side view of FIG. 3, the stationary part 100 is formed from multiple sections 100' which are identical and chamfered at either end so as to ensure that neighboring sections 100' are easily and accurately aligned during installation in the hoistway 2. Furthermore, the permanent magnets 116 are arranged sequentially along the vertical axis y of the opposing side walls 108 between non-magnetic elements 118. The non-magnetic elements 118 can act as magnetic flux concentrators to further enhance efficiency of the linear drive system 20. Advantageously, the depth of the permanent magnets 116 and the non-magnetic elements 118 are identical so as to form a consistently flat surface facing towards the movable part 200. Furthermore, to reduce ripple force when the linear drive system 20 is in operation, the polar axes of the permanent magnets 116 can be aligned at a non-zero angle $\alpha$ to the horizontal axis x and can be for example 45°. Preferably, as illustrated in the figure, this angle $\alpha$ is identical to that defining the chamfers at the ends of each stationary section 100'. In the present example there are three pairings of permanent magnets 116 and non-magnetic elements 118. It is beneficial to provide pairings of magnets 116 and non-magnetic elements 118 along the entire length of the stationary sections 100' so that on installation of neighboring sections 100', the correct magnetic sequence is maintained throughout the entire vertical height of the stationary part 100 eventually formed from the sections 100'.

Figure 2:
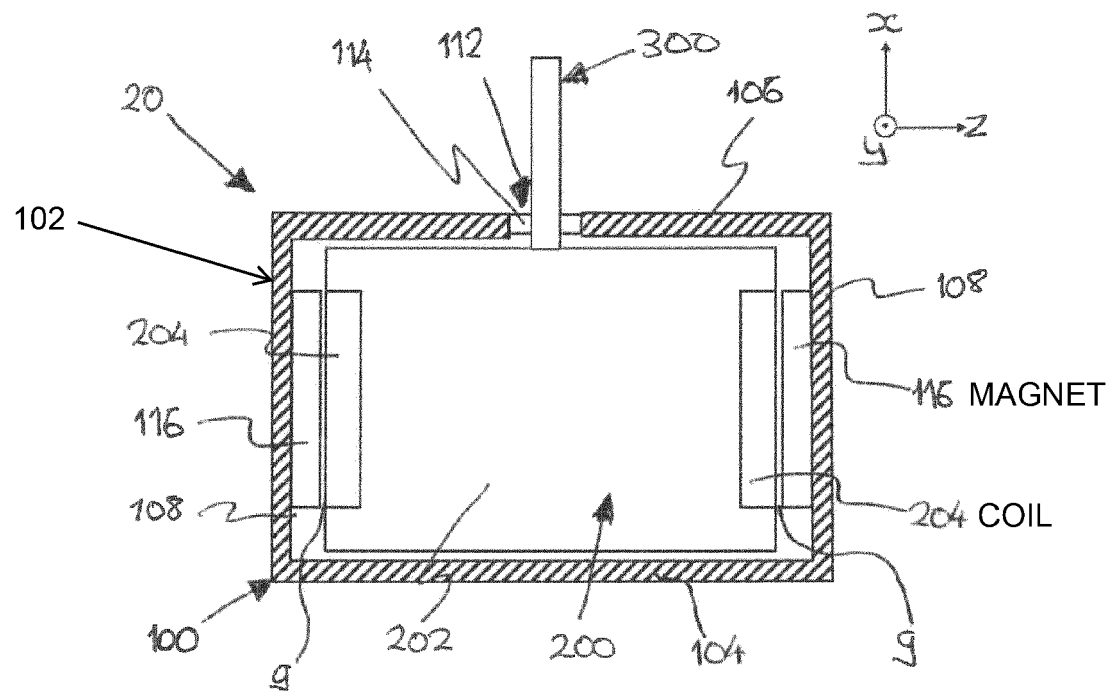
FIG. 2 is a schematic plan view of a cross-section through the linear drive system illustrated in FIG. 1.
Figure 4:
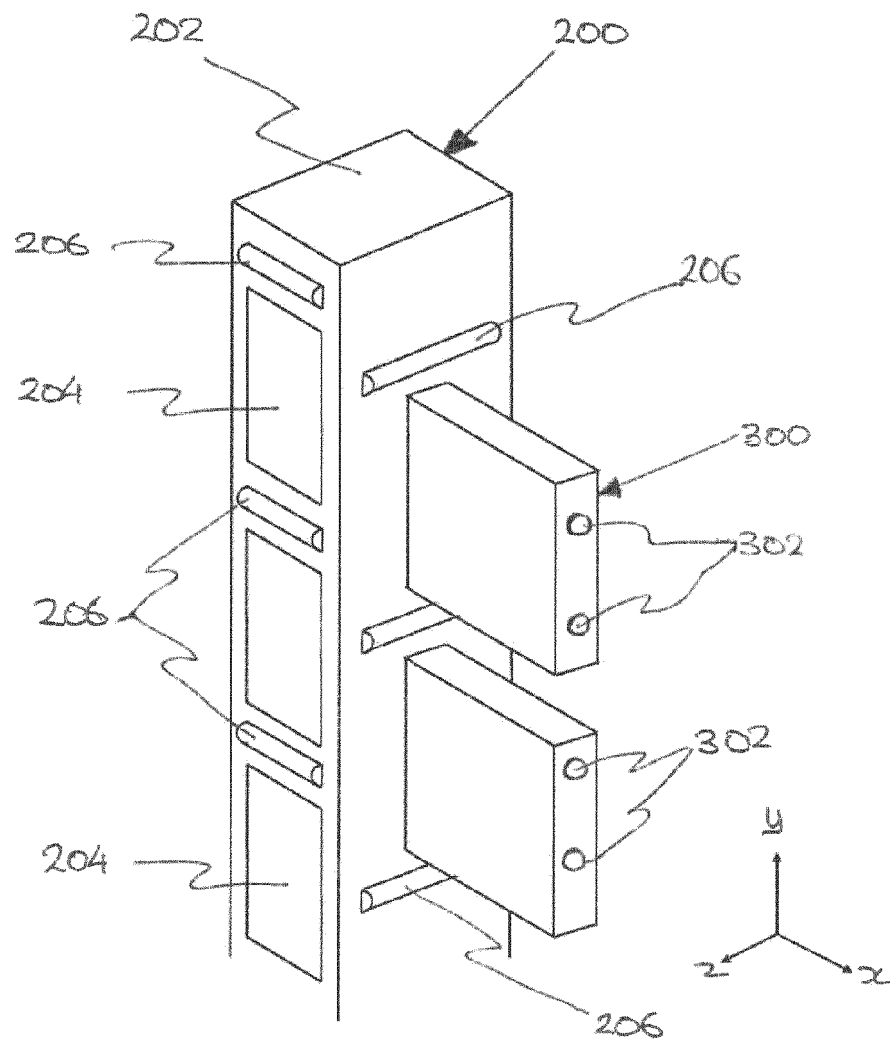
FIG. 4 is a schematic perspective view illustrating a movable part of the linear drive system of FIGS. 1 to 3 in conjunction with a bridge portion interconnecting the movable part to an elevator car.

FIG. 4 is a schematic, partial perspective view illustrating a movable part 200 of the linear drive system 20 of FIGS. 1 to 3 in conjunction with the bridge portion 300 interconnecting the movable part 200 to the elevator car 6. As previously discussed, the coils 204 are embedded into the side walls of the main body 202 of the movable part 200 so as to face the permanent magnets 116 of the stationary part 100 across an air gap g. The bridge portions 300 are fixed to and extend from a front wall of the main body 202, extend through the longitudinal opening or slot 112 in the stationary part 100 and are rigidly connected to the elevator car 6 so that vertical movement of the movable part 200 relative to the stationary part 100 results in corresponding vertical movement of the car 6 along the hoistway 2. Preferably, one or more ducts 302 can be provided in the bridge portions 300 so as to provide passage of electrical cables through to the main body 202 and subsequently onto the coils 204.

In order to prevent the movable part 200 from moving in the horizontal x-z plane within the stationary part 100 while ensuring smooth vertical relative movement, guidance means is provided between movable part 200 and the stationary part 100. In the present example, the guidance means is in the form of horizontally aligned needle bearings 206 provided on each of the walls of the main body 202. The needle bearings 206 on the side walls of the main body 202 are interposed the coils 204 so as to engage the consistently flat surface formed by the alternating sequence of permanent magnets 116 and non-magnetic elements 118 on the side walls 108 of the stationary part 100 (described above in relation to FIG. 3). In this manner, not only do the needle bearings 206 prevent the movable part 200 from moving in the transverse direction z, but also ensures that a small air gap g between the coils 204 and the permanent magnets 116 can be provided and consistently maintained during vertical travel of the movable part 200 relative to the stationary part 100. Similarly, the needle bearings 206 provided on the front and rear walls of the main body 202 prevent the movable part 200 from moving in the lateral direction x relative to the stationary part 100.

In operation of the elevator installation 1 illustrated in FIG. 1, controllable electrical power can be supplied synchronously to each of the linear drive systems 20 so as to either maintain the self-propelled elevator car 6 at a stationary vertical position within the hoistway or to actively drive the elevator car 6 upwards or downwards along the hoistway 2.

Furthermore, although not specifically shown, it will be appreciated that the arrangement can be used to independently drive multiple elevator cars within the same hoistway.

Additionally, the present invention can be used in an elevator installation whereby the movable part 200 of the drive system 20 can be interconnected via the one or more bridge portions 300 to either the elevator car 6 or to the counterweight to effect travel of the elevator.

The stationary part 100 of the drive system 20 can be installed independently of any conventional guide rails or, as shown in FIG. 1, can be used as a replacement to conventional guide rails whether they are car or counterweight guide rails.

In particular, it will be appreciated that the linear drive system 20 according to the present invention can be applied globally to all elevator configurations no matter whether the elevator car is center or cantilever guided or whether the installation utilizes a counterweight or not. There is no previous disclosure of a linear drive that can be used globally for all of these elevator configurations.

In the foregoing description, the active basic component of the drive, the coils, are provided with the movable part whereas the passive magnets are provided on the stationary part. It will be appreciated the reverse configuration can also be applied.

The permanent linear drive system according to the invention and the corresponding elevator installations are space-saving in the projection of the shaft.

The individual elements and aspects of the different forms of embodiment can be combined with one another as desired.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A linear drive system for an elevator installation having an elevator car, the linear drive system comprising:
   a stationary part adapted to be aligned with a hoistway wall of the elevator installation;
   a movable part movable along the stationary part, the movable part adapted to be connected to the elevator car or to a counterweight of the elevator installation;
   wherein the stationary part includes an enclosure encircling the movable part and having a longitudinal slot formed therein;
   a plurality of brushes or resilient elements closing the slot such that the enclosure, with the brushes or the resilient elements, completely envelopes the movable part; and
   at least one bridge portion connected to the movable part and adapted to interconnect the movable part to either the elevator car or a counterweight of the elevator installation, the brushes or the resilient elements permitting passage of the bridge portion along the slot and the brushes or the resilient elements closing the slot after the passage of the bridge portion thereby preventing pollution from egressing into the stationary part.

2. The linear drive system according to claim 1 wherein a plurality of permanent magnets is provided on one of the stationary part and the movable part and at least one coil is provided on another of the stationary part and the movable part.

3. The linear drive system according to claim 2 wherein the permanent magnets are aligned at a non-zero angle relative to a horizontal axis of the one of the stationary part and the movable part.

4. The linear drive system according to claim 2 wherein the permanent magnets are neodymium permanent magnets.

5. The linear drive system according to claim 2 wherein the permanent magnets are ferrite permanent magnets.

6. The linear drive system according to claim 2 wherein the permanent magnets are arranged sequentially between non-magnetic elements.

7. The linear drive system according to claim 6 wherein depths of the permanent magnets and the non-magnetic elements are identical.

8. The linear drive system according to claim 2 wherein an air gap is formed between the at least one coil and the permanent magnets that is less than 1 mm.

9. The linear drive system according to claim 1 wherein the enclosure is fabricated from sheet metal.

10. The linear drive system according to claim 1 wherein the stationary part is formed from successive sections each having chamfered ends.

11. The linear drive system according to claim 1 including guidance means disposed between the stationary part and the movable part.

12. The linear drive system according to claim 11 wherein the guidance means are needle bearings.

13. An elevator installation comprising:
   an elevator car;
   a linear drive system according to claim 1; and
   the at least one bridge portion interconnecting the movable part of the linear drive system to either the elevator car or a counterweight of the elevator installation.

14. A linear drive system for an elevator installation having an elevator car, the linear drive system comprising:
   a stationary part adapted to be aligned with a hoistway wall of the elevator installation, the stationary part being formed as a rectangular enclosure having a wall with a longitudinal opening and a plurality of permanent magnets attached to an inner surface of another wall of the enclosure;
   a movable part movable along the stationary part, the movable part adapted to be connected to the elevator car or to a counterweight of the elevator installation by a bridge portion extending through the longitudinal opening, the movable part including a plurality of coils;
   wherein the stationary part substantially envelopes the movable part; and
   a plurality of brushes or resilient elements closing the longitudinal opening such that the enclosure, with the brushes or the resilient elements, completely envelopes the movable part, the brushes or the resilient elements permitting passage of the bridge portion in the longitudinal opening and the brushes or the resilient elements closing the longitudinal opening after the passage of the bridge portion thereby preventing pollution from egressing into the stationary part.

15. The linear drive system according to claim 14 wherein the wall with the longitudinal opening is a front wall, the another wall is a first side wall and the enclosure includes a second side wall opposing the first side wall and having another plurality of permanent magnets attached to an inner surface thereof, and wherein the movable part has a main body with opposing sides in which the coils are embedded.

16. The linear drive system according to claim 14 wherein the brushes or the resilient elements are positioned in the opening on opposite sides of the bridge portion.

17. The linear drive system according to claim 1 wherein the brushes or the resilient elements are positioned in the slot on opposite sides of the bridge portion.

* * * * *